United States Patent [19]

Kobylinski et al.

[11] 4,122,039

[45] * Oct. 24, 1978

[54] PROCESS FOR PREPARING CATALYST

[75] Inventors: Thaddeus P. Kobylinski; Brian Taylor, both of Gibsonia; Roger F. Vogel, Butler, all of Pa.

[73] Assignee: Gulf Research & Development Company, Pittsburgh, Pa.

[*] Notice: The portion of the term of this patent subsequent to Jun. 22, 1993, has been disclaimed.

[21] Appl. No.: 796,145

[22] Filed: May 12, 1977

Related U.S. Application Data

[63] Continuation-in-part of Ser. No. 711,854, Aug. 5, 1976.

[51] Int. Cl.$^2$ ............................................. B01J 27/14
[52] U.S. Cl. .................... 252/435; 252/437; 423/213.2; 423/213.5; 423/239
[58] Field of Search ................ 423/213.2, 213.5, 239; 252/435, 437

[56] References Cited

U.S. PATENT DOCUMENTS

| | | | |
|---|---|---|---|
| 2,890,167 | 6/1959 | Haensel | 252/435 X |
| 3,224,831 | 12/1965 | Stephens | 423/213.5 |
| 3,850,843 | 11/1974 | Kunugi et al. | 252/437 X |
| 3,895,093 | 7/1975 | Weidenbach et al. | 252/466 PT X |
| 3,895,095 | 7/1975 | Kobylinski et al. | 252/437 X |
| 3,912,657 | 10/1975 | Kobylinski et al. | 252/437 |
| 3,965,040 | 6/1976 | Kobylinski et al. | 252/435 |
| 4,020,013 | 4/1977 | Brennan | 423/213.5 X |

*Primary Examiner*—Delbert E. Gantz
*Assistant Examiner*—William G. Wright

[57] ABSTRACT

A process for preparing a catalyst which involves coating a support with a first solution containing a platinum or palladium salt and a rhodium salt, calcining, further coating the calcined support with a second solution containing a salt of ruthenium and an oxide, salt or acid of phosphorus and then further calcining.

19 Claims, No Drawings

PROCESS FOR PREPARING CATALYST

This application is a continuation-in-part application of our U.S. patent application Ser. No. 711,854, filed Aug. 5, 1976, entitled PROCESS FOR REMOVING CARBON MONOXIDE, UNBURNED HYDROCARBONS AND NITROGEN OXIDES FROM AUTOMOTIVE GASES.

BACKGROUND OF THE INVENTION

1. Field of the Invention

This invention relates to a process for preparing a catalyst which involves coating a support with a first solution containing a platinum or palladium salt and a rhodium salt, calcining, further coating the calcined support with a second solution containing a salt of ruthenium and an oxide, salt or acid of phosphorus and then further calcining.

2. Description of the Prior Art

During normal operation of an internal combustion engine, such as that of an automobile, the principal undesirable components in the exhaust gas, namely, nitrogen oxides, carbon monoxide and unburned hydrocarbons, that are discharged into the atmosphere can be reduced in amount by first passing the exhaust gas over ruthenium and/or rhodium under a reducing atmosphere to convert the nitrogen oxides selectively to nitrogen and then passing the treated gas, together with added oxygen, over platinum and/or palladium under an oxidizing atmosphere to convert the carbon monoxide and unburned hydrocarbons to carbon dioxide and water. By "reducing atmosphere" we mean an atmosphere wherein the stoichiometric ratio of molecular oxygen to reducing agents in the reaction zone is less than 1:1, preferably about 0.9:1 or even less. By "oxidizing atmosphere" we mean an atmosphere wherein the stoichiometric ratio of oxygen to reducing agents (for example, carbon monoxide plus hydrocarbons) is at least about 1:1, preferably about 2:1 or more.

During startup or cold start, however, when the engine is cold and operation thereof is effected under closed choke where the air to fuel ratio is lower than stoichiometrically required with a small amount of air, the engine exhaust contains insignificant amounts of nitrogen oxide but significantly larger amounts of carbon monoxide and unburned hydrocarbons than would be present during normal operation. Similarly, the ruthenium or rhodium catalysts and the platinum or palladium catalysts are at ambient temperature and will not begin to perform their intended functions until reaction temperature is reached. Since the amount of nitrogen oxides present during startup under closed coke is small, no problem exists during such period because of the inactivity of ruthenium. However, the presence of larger amounts of carbon monoxide and unburned hydrocarbons in the exhaust gas from the beginning of operation requires that they be converted immediately to the innocuous carbon dioxide and water. However, since the platinum catalyst is located at a further distance from the engine, it will require a relatively long time for the exhaust gases to raise the temperature thereof to a level at which a desired oxidation of carbon monoxide and unburned hydrocarbons takes place. Until such temperature level is reached the undesired carbon monoxide and unburned hydrocarbons will be discharged into the atmosphere.

Ruthenium, on the other hand, is closer to the engine manifold and it will reach a higher temperature level sooner than platinum. Therefore, it might be expected that during startup oxygen could be introduced into the exhaust gas prior to its contact with ruthenium so that the ruthenium could serve as oxidation catalyst for the desired conversion of carbon monoxide and unburned hydrocarbons. Thereafter when the platinum catalyst reached reaction temperature, the oxygen flow could then be switched to the mixture entering the platinum reaction zone. Unfortunately, ruthenium is not a satisfactory oxidation catalyst in the defined reaction, for its reactivity is too low to obtain sufficient oxidation at low temperatures.

In our U.S. Pat. No. 3,965,040 we claimed a process for preparing a catalyst which involves coating a support with a first solution containing a platinum or palladium salt, calcining, further coating the calcined support with a solution containing a ruthenium or rhodium salt and an oxide, salt or acid of phosphorus and then further calcining.

SUMMARY OF THE INVENTION

We have discovered a process that will produce a catalyst that can be used under a reducing atmosphere to convert nitrogen oxides selectively to nitrogen or under an oxidizing atmosphere to convert the carbon monoxide and unburned hydrocarbons to carbon dioxide and water. Under such circumstances, then, not only can the same catalyst be used in each of the two conversion stages defined above, but during startup oxygen can be introduced into the first stage of the process and the catalyst therein will serve as oxidation catalyst for the desired conversion of carbon monoxide and unburned hydrocarbons to carbon dioxide and water. After startup, oxygen introduction to the first stage will be terminated and the two stages can then be operated as described above, under a reducing atmosphere and an oxidation atmosphere, respectively, to remove nitrogen oxides and carbon monoxide and unburned hydrocarbons from the auto exhaust gas.

The support for the catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about 1 to about 500 $m^2$ per gram, preferably from about 10 to about 300 $m^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tennessee, which is more fully described in U.S. Pat. No. 3,444,925. If desired, the metals can be mounted directly onto the surface of the ceramic material or the ceramic material can first be coated with a refractory oxide, such as defined above, prior to the deposition of the metals thereon. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

The first step in the preparation of the catalyst herein requires that the support defined above, or similar suitable support, be coated with a salt of platinum and/or palladium, such as chloroplatinic acid, platinum tetraamine dinitrate, platinum chloride, palladium tetraamino dinitrate, palladium chloride, ammonium chloropallidite, etc., and a salt of rhodium, such as rhoddium chloride, rhodium nitrate, etc. This can be done, for example, by dissolving the selected platinum or palladium salt and rhodium salt in a suitable solvent, such as water, ethanol, 2,4-pentanedione, etc., maintained at a temperature of about 5° to about 90° C., preferably about 15° to about 40° C., and a pressure of about 0 to about 150 pounds per square inch gauge (about 0 to about 10 kilograms per square centimeter), preferably about 0 to about 5 pounds per square inch gauge (about 0 to about 0.3 kilograms per square centimeter), immersing the support in the solution for about 1 second to about 3 hours, preferably about 1 minute to about 2 hours, draining off excess solution, drying in air, for example, at a temperature of about 70° to about 200° C. for about ½ to about 20 hours, and finally calcining in air at a temperature of about 350° to about 700° C., preferably about 400° to about 600° C., and a pressure of about 0 to about 150 pounds per square inch gauge (about 0 to about 10 kilograms per square centimeter), preferably about 0 to about 5 pounds per square inch gauge (about 0 to about 0.3 kilograms per square centimeter), for about 1 to about 20 hours, preferably about 6 to about 15 hours. In a preferred embodiment, after draining off the excess solution, but before drying, the support is contacted with a stream of $H_2S$ in order to fix or stabilize, that is, inhibit migration of the platinum and/or palladium salts and rhodium salt. The wet support is contacted with the $H_2S$ at a temperature of about 5° to about 80° C., preferably about 15° to about 40° C., and a pressure of about 0 to about 150 pounds per square inch gauge (about 0 to about 10 kilograms per square centimeter), preferably about 0 to about 5 pounds per square inch gauge (about 0 to about 0.3 kilograms per square centimeter), for a period of about 1 minute to about 4 hours, preferably about 15 minutes to about 2 hours. The amount of $H_2S$ used over such period of time is at least about 2 times the amount stoichiometrically required for reaction with the metal salts, preferably about 2 to about 1000 times the stoichiometric amount.

The treated support is then further coated with a solution containing a salt of ruthenium and an oxide, salt or acid of phosphorus wherein phosphorus has a valence of +3 or +5. Examples of ruthenium salts that can be used include ruthenium chloride, ruthenium acetylacetonate, ruthenium nitrate, ruthenium nitrosonitrate, etc., and of oxides, salts or acids of phosphorus include $P_2O_5$, $HPO_3$, $H_3PO_4$, $H_4P_2O_7$, $PCl_3$, $P_2O_3$, $(NH_4)_2HPO_4$, $(NH_4)_3PO_4$, $NH_4H_2PO_4$, etc. This can be done, for example, by dissolving the ruthenium salt and the oxide, acid or salt of phosphorus in a suitable solvent, such as water, ethanol, hydrochloric acid, acetylacetone, etc., maintained at a temperature of about 5° to about 80° C., preferably a temperature of about 15° to about 30° C., and a pressure of about 0 to 150 pounds per square inch gauge (about 0 to about 10 kilograms per square centimeter), preferably about 0 to about 5 pounds per square inch gauge (about 0 to about 0.3 kilograms per square centimeter), immersing the support in the solution for about 1 second to about 3 hours, preferably about 1 minute to about 2 hours, draining off the excess solution, drying in air, for example, at a temperature of about 70° to about 200° C. for about ½ to about 20 hours, and finally calcining in air at a temperature of about 350° to about 700° C., preferably about 400° to about 600° C., and a pressure of about 0 to about 150 pounds per square inch gauge (about 0 to about 10 kilograms per square centimeter), preferably about 0 to about 5 pounds per square inch gauge (about 0 to about 0.3 kilograms per square centimeter), for about 1 to about 20 hours, preferably about 6 to about 15 hours.

In a preferred embodiment the solution containing the ruthenium salt and an oxide, salt or acid of phosphorus also contains a refractory material, such as a salt of aluminum, titanium, silica, magnesium or zirconium. Examples of such refractory materials are $AlCl_3$, $Al(NO_3)_3$, $MgCl_2$, $TiCl_4$, etc. These refractory materials have a tendency to help disperse the solution on the surface of the support and to inhibit volatilization of the ruthenium. An additional preferred embodiment involves passing ammonia gas over the support after draining off the excess solution of the metal salt and phosphorus compound but before drying. The ammonia gas can react with excess phosphorus compound on the surface of the support as well as help disperse solution over the support in order to stabilize the same thereon. The ammonia gas is believed to fix the metal and to aid in compound formation. The wet support is contacted with ammonia gas at a temperature of about 5° to about 90° C., preferably about 15° to about 70° C. and a pressure of about 0 to about 150 pounds per square inch gauge (about 0 to about 10 kilograms per square centimeter), preferably about 0 to about 5 pounds per square inch gauge (about 0 to about 0.3 kilograms per square centimeter), for about 1 minute to about 4 hours, preferably about 15 minutes to about 2 hours. The amount of ammonia gas used over such period of time is at least about 2 mols per total mols of combined mols of ruthenium salt and phosphorus compound on the support being treated, preferably about 2 to about 1000 mols, per total of such mols.

The amounts of each component present in each of the solutions used herein can vary over a wide range depending upon the specific compounds used and the conditions under which the treatments are made. In any event, the amounts of components used and reaction conditions selected are such that the support will carry from about 0.001 to about two weight percent, preferably about 0.01 to about 0.8 weight percent, of platinum and/or palladium, calculated as elemental metal, based on the weight of the support about 0.005 to about 1 weight percent, preferably about 0.01 to about 0.05 weight percent of rhodium, calculated as elemental metal, based on the weight of the support, and from about 0.03 to about 2 weight percent, preferably about 0.5 to about 1 weight percent, of combined ruthenium and phosphorus, calculated as elemental metal, based on the weight of the support. The weight ratio of ruthenium relative to phosphorus can be within the range of about 1:0.1 to about 1:400, preferably about 1:1 to about 1:100. The weight ratio of platinum and/or palladium to rhodium can be in the range of about 100:1 to about 1:10. The weight ratio of platinum and/or palladium to ruthenium can be in the range of about 1:10 to about 10:1, preferably about 1:10 to about 5:1. When $AlCl_3$ is used in the second solution, the final support can carry on its surface aluminum, calculated as metal, relative to combined ruthenium and phosphorus, calculated as metal, in a weight ratio of about 1:0.01 to about 1:100, preferably about 1:0.1 to about 1:10.

DESCRIPTION OF PREFERRED EMBODIMENTS

The process can better be understood by reference to the following.

Example I

Aluminum oxide beads having a diameter of 4 millimeters and a surface area of 180 square meters per gram were immersed either in an aqueous solution containing ruthenium chloride, rhodium chloride, chloroplatinic acid or palladium chloride, dried at a temperature of 120° C. for 6 hours and calcined at a temperature of 480° C. for 12 hours, such that the final product contained on the surfaces thereof, calculated as metal, 0.2 weight per cent of the metal, based on the support. Over a period of 1 hour a feed gas consisting of 1 volume per cent carbon monoxide, 1 volume per cent oxygen and the remainder argon was passed over each of the catalysts so prepared at a gas hourly space velocity (volumes of gas per volume of catalyst per hour) of 20,000. The results obtained are tabulated below in Table I.

TABLE I

| | Weight Per Cent Converted to $CO_2$ | | | |
|---|---|---|---|---|
| Temp., ° C. | Catalyst Containing Ruthenium | Catalyst Containing Rhodium | Catalyst Containing Platinum | Catalyst Containing Palladium |
| 200 | 1 | 5 | 98 | 91 |
| 238 | 5 | 12 | 100 | 100 |
| 260 | 11 | 50 | 100 | 100 |
| 320 | 79 | 91 | 100 | 100 |
| 425 | 98 | 100 | 100 | 100 |

Example II

Over a period of 1 hour a feed gas consisting of 2000 parts per million of $NO_x$, 1 volume per cent carbon monoxide, 1 volume per cent hydrogen and the remainder argon was passed over each of the catalysts prepared in Example I at a gas hourly space velocity of 20,000. The results obtained are tabulated below in Table II.

TABLE II

| | Weight Per Cent $NO_x$ Converted (Per Cent Selectivity to $NH_3$) | | | |
|---|---|---|---|---|
| Temp., ° C. | Catalyst Containing Ruthenium | Catalyst Containing Rhodium | Catalyst Containing Platinum | Catalyst Containing Palladium |
| 420 | 100 (0) | 100 (31) | 80 (65) | 79 (71) |

Example III

Following the identical procedure used in Example I, alumina oxide beads were impregnated with a solution containing chloroplatinic acid and ruthenium chloride to form Catalyst A or with a solution containing chloroplatinic acid, ruthenium chloride and rhodium chloride to form Catalyst B. On each catalyst the amount of metal deposited was 0.1 weight per cent. Each catalyst was subjected to the same test used in Example I for determination of carbon monoxide conversion and to the same test used in Example II for determination of $NO_x$ conversion and selectivity to $NH_3$. The results obtained are tabulated below in Table III.

TABLE III

| | Weight Per Cent CO Converted to $CO_2$/ Weight Per Cent $NO_x$ Converted/And Selectivity to $NH_3$ | |
|---|---|---|
| Temp., ° C. | Catalyst A | Catalyst B |
| 400 | 80/81/30 | 88/79/31 |
| 450 | 82/83/25 | 91/80/26 |

Example IV

Two 9.3 centimeters × 15.2 centimeters EX-20 Corning corderite monoliths composed of $Al_3(Mg.Fe)_2Si_5AlO_{18}$, each carrying a layer of $Al_2O_3$ thereon, amounting to about 11 weight per cent based on the uncoated monolith, wherein the $Al_2O_3$ has a surface area of 180 square meters per gram, were soaked in an aqueous solution containing 0.08 weight per cent chloroplatinic acid for 1 hour, drained and then, while still wet, contacted with 10,000 cubic centimeters of $H_2S$ gas over a period of 1 hour at a temperature of 30° C. Two similar monoliths were immersed in an aqueous solution containing 1.05 weight per cent of ruthenium chloride, 10 weight per cent phosphoric acid and 2 weight per cent of aluminum chloride for 1 hour, drained and then, while still wet, contacted with 10,000 cubic centimeters of ammonia gas over a period of 1 hour at a temperature of 30° C. The first set of monoliths was dried at 120° C. overnight and calcined at 538° C. overnight. The second set of monoliths was dried at 120° C. overnight, calcined for 6 hours at 260° C. and further calcined at 649° C. overnight. The first set of monoliths carried 0.10 weight per cent platinum, calculated as metal, as coating thereon, while the second set carried 0.12 weight per cent ruthenium.

An exhaust gas from a 350 CID Chevrolet engine was passed separately, but directly, over one of the monoliths so produced containing platinum and one containing ruthenium. The atmosphere therein was a reducing atmosphere. In another set of runs about 3 volume per cent of oxygen was added to the exhaust gas and the combined gas was passed separately, but directly, over another of the monoliths containing platinum and another containing ruthenium. In this case the atmosphere was an oxidizing atmosphere. The temperature during the treatments was maintained in the range of about 480° to about 560° C. and the gas hourly space velocity was maintained at 60,000. The composition of the gas issuing from the 350 CID Chevrolet engine is set forth below in Table IV.

TABLE IV

| Component | Volume Per Cent |
|---|---|
| CO | 1.8 |
| $H_2$ | 0.6* |
| $CO_2$ | 14.1 |
| Unburned Hydrocarbons | 1200 ppm |
| $O_2$ | 0.1 |
| $NO_x$ | 900 ppm |
| $N_2$ | Balance |

*Estimated

The results obtained are tabulated below in Table V.

TABLE V

| | Under Reducing Conditions | | Under Oxidizing Conditions | |
|---|---|---|---|---|
| Component In Treated Exhaust Gas | Catalyst Containing Ru | Catalyst Containing Pt | Catalyst Containing Ru | Catalyst Containing Pt |
| $NO_x$, ppm | 20 | 250 | 900 | 900 |

TABLE V-continued

| Component In Treated Exhaust Gas | Under Reducing Conditions | | Under Oxidizing Conditions | |
|---|---|---|---|---|
| | Catalyst Containing Ru | Catalyst Containing Pt | Catalyst Containing Ru | Catalyst Containing Pt |
| $NH_3$, ppm | 5 | 600 | NT | NT |
| CO, Volume % | NT | NT | 1.5 | 0.1 |
| Unburned Hydrocarbons, ppm | NT | NT | 900 | 40 |

NT - Not Taken

Example V

A monolith as described in Example IV was immersed in an aqueous solution containing 1.05 weight per cent of ruthenium chloride, 10.0 weight per cent phosphoric acid and 2.0 weight per cent of aluminum chloride for 1 hour, drained and then, while still wet, contacted with 10,000 cubic centimeters of ammonia gas over a period of 0.5 hour at a temperature of 25° C. The treated monolith was dried at 120° C. overnight, calcined for 6 hours at 260° C. and further calcined at 649° C. overnight. After cooling to room temperature the monolith was then immersed in an aqueous solution containing 0.08 weight per cent of chloroplatinic acid for one hour, drained and then, while still wet, contacted with 10,000 cubic centimeters of $H_2S$ gas over a period of one hour at a temperature of 25° C. The treated monolith contained 0.12 weight per cent of ruthenium and 0.1 weight per cent of platinum, each calculated as metal, based on the weight of the support. The support was then used to treat an auto exhaust gas as in Example IV. The results obtained are set forth below in Table VI.

TABLE VI

| Component In Treated Exhaust Gas | Under Reducing Conditions | Under Oxidizing Conditions |
|---|---|---|
| $NO_x$, ppm | 75 | NT |
| $NH_3$, ppm | 90 | NT |
| CO, Volume % | NT | 1.4 |
| Unburned Hydrocarbons, ppm | NT | 910 |

NT - Not Taken

Example VI

The runs of Example V were repeated with a catalyst similarly prepared except that the support was first treated with the solution containing chloroplatinic acid and then with the solution containing ruthenium chloride. The results obtained are tabulated below in Table VII.

TABLE VII

| Component In Treated Exhaust Gas | Under Reducing Conditions | Under Oxidizing Conditions |
|---|---|---|
| $NO_x$, ppm | 18 | NT |
| $NH_3$, ppm | 4 | NT |
| CO, Volume % | NT | 0.3 |
| Unburned Hydrocarbons, ppm | NT | 14 |

NT - Not Taken

Example VII

The runs of Example VI were repeated with catalyst similarly prepared, except that the metal level was 0.06 weight per cent platinum and 0.06 weight per cent ruthenium. The results obtained with the engine exhaust were similar to those of Table VII.

Results similar to the above will be obtained in the event a palladium salt is used to replace the platinum salt, a rhodium salt is used to replace the ruthenium salt and/or an oxide or salt of phosphorus is used to replace the phosphoric acid.

Example VIII

A 9.3 centimeter × 15.2 centimeter EX-20 Corning corderite monolith composed of $Al_3(Mg.FE)_2Si_5AlO_{18}$ carrying a layer of $Al_2O_3$ thereon, amounting to about 11 weight per cent based on the uncoated monolith, wherein the $Al_2O_3$ had a surface area of 180 square meters per gram, was immersed in an aqueous solution containing chloroplatinic acid for 1 hour, drained and then, while still wet, contacted with 10,000 cubic centimeters of $H_2S$ gas over a period of 1 hour at a temperature of 25° C. The treated monolith was dried at 125° C. overnight and calcined at 538° C. overnight. In one case the monolith, after being cooled to 25° C., was then immersed in an aqueous solution containing ruthenium chloride and in a second case with both ruthenium and rhodium chlorides. Both solutions also contained 10 weight per cent phosphoric acid and 2.0 weight per cent of aluminum chloride. The monoliths were drained and then, while still wet, contacted with 10,000 cubic centimeters of ammonia gas over a period of 0.5 hour at a temperature of 25° C. The treated monolith was dried at 120° C. overnight, calcined for 6 hours at 260° C., further calcined at 649° C. overnight and then cooled to 25° C. The amounts of metal salts used were adjusted to obtain a selected level of metal on the catalyst surface. The first monolith carried 0.04 weight per cent of platinum and 0.8 weight per cent of ruthenium, while the second monolith carried 0.05 weight per cent of platinum, 0.1 weight per cent of ruthenium and 0.02 weight per cent of rhodium. When exposed to exhaust gas generated by 350 CID Chevrolet engine operating under a load equivalent to from 30 to 55 miles per hour (48.4 to 88.7 kilometers per hour) wherein the stoichiometric air to fuel ratio was 14.55:1, the following results were obtained:

TABLE VIII

| Monolith | Weight Per Cent Converted | | | Weight Per Cent of $NO_x$ Converted to $NH_3$ | Total Efficiency (Average of Conversions) |
|---|---|---|---|---|---|
| | CO | Unburned Hydrocarbons | $NO_x$ | | |
| First | 82 | 89 | 90 | 0 | 87 |
| Second | 86 | 91 | 96 | 0 | 91 |

Example IX

A 9.3 centimeter × 15.2 centimeter EX-20 Corning corderite monolith composed of $Al_3(Mg.Fe)_2Si_5AlO_{18}$ carrying a layer of $Al_2O_3$ thereon amounting to about 11 weight per cent based on the uncoated monolith, wherein the $Al_2O_3$ had a surface area of 180 square meters per gram, was immersed in an aqueous solution containing chloroplatinic acid for 1 hour, drained, and then, while still wet, contacted with 10,000 cubic centimeters of $H_2S$ gas over a period of 1 hour at a temperature of 25° C. The treated monolith was dried at 125° C. overnight, and then calcined at 538° C. again overnight. The monolith, after being cooled to room temperature, was then immersed in an aqueous solution containing ruthenium chloride and rhodium chloride with 10 weight per cent phosphoric acid and 2.0 weight per cent of aluminum chloride for 1 hour, drained and then, while still wet, contacted with 10,000 cubic centimeters of ammonia gas over a period of 0.5 hour at a temperature of 25° C. The treated monolith was dried at 120° C. overnight, calcined for 6 hours at 260° C., further calcined at 649° C. overnight and then cooled to room temperature. The amounts of metal salts used were adjusted to obtain a selected level of metal on the catalyst surface. The final catalyst prepared contained 0.05 weight per cent ruthenium, 0.006 weight per cent rhodium, and 0.03 weight per cent platinum.

Passing exhaust gas under conditions identical to those of Example VIII, the following results were obtained:

TABLE IX

| Weight Per Cent Converted | | | Weight Per Cent | |
|---|---|---|---|---|
| CO | Unburned Hydrocarbons | $NO_x$ | of $NO_x$ Converted to $NH_3$ | Total Efficiency |
| 84 | 91 | 92 | 0 | 89 |

Example X

A 9.3 centimeter × 15.2 centimeter EX-20 Corning corderite monolith composed of $Al_3(Mg.Fe)_2Si_5AlO_{18}$ carrying a layer of $Al_2O_3$ thereon amounting to about 11 weight per cent based on the uncoated monolith, wherein the $Al_2O_3$ has a surface area of 180 square meters per gram, was immersed in an aqueous solution containing chloroplatinic acid and rhodium chloride for 1 hour, drained and then, while still wet, contacted with 10,000 cubic centimeters of $H_2S$ gas over a period of 1 hour at a temperature of 25° C. The treated monolith was dried at 125° C. overnight and calcined at 583° C. overnight. The monolith, after being cooled to room temperature, was then immersed in an aqueous solution containing ruthenium chloride with 10 weight per cent phosphoric acid and 2.0 weight per cent of aluminum chloride for one hour, drained and then, while still wet, contacted with 10,000 cubic centimeters of ammonia gas over a period of 0.5 hour at a temperature of 25° C. The treated monolith was dried at 120° C. overnight, calcined for 6 hours at 260° C., further calcined at 649° C. overnight and then cooled to room temperature. The amounts of metal salts used were adjusted to obtain a selected level of metal on the catalyst surface. The prepared catalyst contained 0.10 weight per cent of ruthenium, 0.06 weight per cent of rhodium, and 0.06 weight per cent of platinum.

Passing exhaust gas under conditions identical to those of Example VI, the following results were obtained:

TABLE X

| Weight Per cent Converted | | | Weight Per Cent | |
|---|---|---|---|---|
| CO | Unburned Hydrocarbons | $NO_x$ | of $NO_x$ Converted to $NH_3$ | Total Efficiency |
| 86 | 92 | 89 | 0 | 89 |

Results similar to the above will be obtained in the event a palladium salt is used to replace the platinum salt and/or an oxide or salt of phosphorus is used to replace the phosphoric acid.

That it is imperative that the catalyst effective for removing nitrogen oxides under a reducing atmosphere and carbon monoxide and unburned hydrocarbons under an oxidizing atmosphere be prepared by first coating the support with platinum or palladium and rhodium, calcining, further coating with ruthenium and an oxide, salt or acid of phosphorus is apparent from the data in the examples above. Thus, in Example I it can be seen that neither ruthenium nor rhodium are as effective oxidation catalysts as are platinum or palladium. In Example II it is shown that while ruthenium is an excellent reduction catalyst and rhodium is a fair reduction catalyst for use in treating auto exhaust gases, neither platinum nor palladium is a satisfactory reduction catalyst. Example III shows that when the metals are coprecipitated from a single solution containing an oxidatin catalyst (platinum) and a reduction catalyst (ruthenium) or a combination of reduction catalysts (ruthenium and rhodium) on the support and such catalyst is used to reduce the carbon monoxide content on the nitrogen oxide content of an auto exhaust gas, such catalyst is reasonably effective as an oxidation catalyst but poor as a reduction catalyst, for the amount of ammonia formed is excessive. In Example IV the data further show that while ruthenium is an effective reduction catalyst, it is not very effective as an oxidation catalyst. Conversely, while platinum is again shown to be an effective oxidation catalyst, its effectiveness as a reduction catalyst is poor. It can be seen from Example V that when the catalyst is prepared by first adding ruthenium to the support and then platinum, the catalyst obtained is not effective for both reduction and oxidation. However, Examples VI and VII show that if the platinum is first placed on the support followed by ruthenium, the resultant catalyst is effective for use in both the reduction and oxidation stages in the treatment of auto exhaust gases. Example VIII demonstrates that the addition of a small amount of rhodium to the catalyst is beneficial in the simultaneous removal of carbon monoxide, unburned hydrocarbons and nitrogen oxides from an auto exhaust. Examples IX and X show that an equally effective catalyst for the removal of carbon monoxide, unburned hydrocarbons and nitrogen oxides can be prepared whether or not rhodium is added to the catalyst with platinum in the first step or with ruthenium in the second.

Why it is critical, in producing a catalyst herein that can function equally well in a reducing and/or oxidation mode, that the platinum or palladium and rhodium and the ruthenium be placed separately on the support and, moreover, that the platinum or palladium and rhodium be placed on the support prior to ruthenium, rather than ruthenium prior to platinum or palladium and rhodium, we are not certain. It is most unusual that this be so, for we do not believe that the phenomenon involved is due to the selective building up of one coating of metal on the other. Thus, we have calculated that if the amount of metals defined herein were placed on the supports defined herein as monomolecular layers thereof, the metal coatings would not cover all of the surface area of the support.

Obviously, many modifications and variations of the invention, as hereinabove set forth, can be made without departing from the spirit and scope thereof, and therefore only such limitations should be imposed as are indicated in the appended claims.

We claim:

1. A process for preparing a catalyst consisting essentially in coating a support having a surface area of about 1 to about 500 square meters per gram with a first solution consisting essentially of a first metal salt selected from the group consisting of a salt of platinum and palladium and a salt of rhodium, calcining, further coating the calcined base with a second solution consisting essentially of a salt of ruthenium and a phosphorus compound selected from the group consisting of a phosphorus oxide, a phosphorus salt and a phosphorus acid and then further calcining to produce a support containing from about 0.001 to about 2 weight per cent of platinum or palladium, about 0.005 to about 1 weight per cent of rhodium and about 0.03 to about 2 weight per cent of combined ruthenium and phosphorus.

2. The process of claim 1 wherein said first metal salt is a platinum salt.

3. The process of claim 1 wherein said first metal salt is chloroplatinic acid.

4. The process of claim 1 wherein said first metal salt is a palladium salt.

5. The process of claim 1 wherein said rhodium salt is rhodium chloride.

6. The process of claim 1 wherein said ruthenium salt is ruthenium chloride.

7. The process of claim 1 wherein said phosphorus compound is phosphoric acid.

8. The process of claim 1 wherein said support is composed of a refractory oxide.

9. The process of claim 1 wherein said support is composed of alumina.

10. The process of claim 1 wherein said support has a surface area of about 10 to about 300 square meters per gram.

11. The process of claim 1 wherein following said first coating but prior to said first calcination said coated support is contacted with $H_2S$ gas.

12. The process of claim 10 wherein said contact with $H_2S$ is effected in a temperature range of about 5° to about 80° C.

13. The process of claim 10 wherein said contact with $H_2S$ is effected in a temperature range of about 15° to about 40° C.

14. The process of claim 1 wherein following said second coating but prior to said second calcination said coated support is contacted with ammonia gas.

15. The process of claim 14 wherein said contact with ammonia gas is effected in a temperature range of about 5° to about 90° C.

16. The process of claim 14 wherein said contact with ammonia gas is effected in a temperature range of about 15° to about 70° C.

17. The process of claim 1 wherein said second solution also contains a refractory material.

18. The process of claim 17 wherein said refractory material is aluminum chloride.

19. The process of claim 1 wherein the support contains from about 0.01 to about 0.8 weight per cent of platinum or palladium, about 0.01 to about 0.5 weight per cent rhodium and about 0.05 to about one per cent of combined ruthenium and phosphorus.

* * * * *

UNITED STATES PATENT OFFICE
CERTIFICATE OF CORRECTION

Patent No. 4,122,039            Dated    October 24, 1978

Inventor(s) Thaddeus P. Kobylinski, Brian W. Taylor and Roger F. Vogel

It is certified that error appears in the above-identified patent and that said Letters Patent are hereby corrected as shown below:

COL. 4, line 58, "0.5" should read --0.05--.

Signed and Sealed this

Twentieth Day of March 1979

[SEAL]

Attest:

RUTH C. MASON
*Attesting Officer*

DONALD W. BANNER
*Commissioner of Patents and Trademarks*